United States Patent Office 2,971,832
Patented Feb. 14, 1961

2,971,832
GRANULATION OF MIXED FERTILIZERS

Thomas H. Stewart, Jr., Atlanta, Ga., and Robert A. MacDonald, Highland Park, Ill., assignors to International Minerals & Chemical Corporation, a corporation of New York No Drawing. Filed Dec. 6, 1955, Ser. No. 551,216

4 Claims. (Cl. 71—64)

This invention relates to the production of mixed fertilizers in granular form. Still more particularly it relates to the production of mixed fertilizers of maximum uniformity of granule size. Still more particularly it relates to granulation of low nitrogen content mixed fertilizers without addition of liquid medium other than the nitrogen solution.

Granulation of mixed fertilizers has been common practice for many years. Granulation is difficult in those grades where small amounts of nitrogen solution are used in formulation and has been limited to a few grades of fertilizers having a relatively large nitrogen content added predominantly in the form of a solution. If the liquid and soluble salt content of the nitrogen solution is insufficient for forming cohesive masses and firmly cementing the masses into granules then water or steam is added. Addition of moisture is a disadvantage because it introduces a substance which must be removed, before the granules can be stockpiled, with the added expense of a difficult drying operation. The increased moisture presents control problems because a slight increase or excess of water, in a mixture where ingredients have varying water absorption characteristics, results in formation of large granules or oversize granules of commercially unacceptable particle size which must be crushed and screened or reprocessed to produce a product in the range, for example, of about —6 +24 mesh standard screen size.

It is a primary object to provide a method of granulation which overcomes the shortcomings and disadvantages of processes heretofore in use.

It is another object to provide a method of granulating which produces a superior mixture for ammoniation.

It is the object to provide a method wherein granulation can be effectively accomplished with the only added moisture being that of the commercially available nitrogen solutions such as urea-ammonia and ammonium nitrate-ammonia solutions.

It is the object to provide a method wherein the mixed fertilizer blending is accomplished with at least one ingredient of a particle size in the range between about +8 mesh and about 35 mesh.

It is the object to provide a method wherein the product of one pass thru the granulating equipment produces about 98% +35 mesh material and about 85% to 90% +14 mesh material.

It is the object to provide a method for certain grades of mixed fertilizers whereby heat drying operations are eliminated and the product passes from tumbler to cooler to stockpile.

These and other objects of the invention will be apparent to those skilled in the art from the following description.

Now it has been discovered that granular mixed fertilizer pellets of relatively uniform size substantially eliminating formation of undesired oversize and undersize material which ordinarily would have to be reprocessed can be produced in a once-through continuous operation by control of the particle size of the solid feed ingredients, i.e., phosphate, potash or fillers or a combination thereof to insure a ratio by weight of fines to specific size particles of a maximum of about 6:4. For fertilizer granulation, material smaller than about 28 to about 48 mesh, depending upon the lower limit of permissible product size, generally is considered fines. The specific sized particles have a size intermediate the upper limit for fines and the upper limit for product size, and preferably have the specific sized particles of sizes distributed throughout the range within the aforesaid limits.

The general procedure for granulation has been to comminute all materials such as superphosphate, triple superphosphate, potash, fillers such as dolomite in a mill and screen either over a ¼ inch or ⅛ inch screen to avoid lumps which would clog the feeders or weightometers. The product obtained under these conditions, if granulation was effected under moisture conditions to produce pasty balls, contains as high as 40% of either +4 or +6 mesh size material which must be ground and screened to recover desired sized product and a recirculation fraction. The product, when moisture was maintained low, contains as much as 60% ungranulated or semi-granulated fines which have to be recirculated as well as about 10% oversize product which must be treated as described above.

In the once-through operation of this invention to form a granular product about 90% to 98% of which will be of the desired particle size, depending upon the narrowness of size range of the desired product, at least one of the feed materials is screened to produce a specific sized fraction and the other ingredients may or may not be screened closely because in general they produce as in the case of ordinary superphosphate from the pile upon disintegration a feed material usually 70% to 80% of which falls into the category of fines according to the instant invention.

To illustrate with reference to a specific formulation known as 5–20–20, the desired product in the northern Mid-Continent area should have a particle size approximately 100% of which is —6 +20 mesh standard screen size. To produce this product according to the instant invention about 800 lbs. of feed per ton of product should have a particle size in the range between about 10 mesh and about 28 mesh. Since the solid or feed components are superphosphate, triple superphosphate and potash, the 10 mesh to 28 mesh fraction may be made up of a combination of all three, or if ordinary superphosphate and ordinary triple superphosphate are used then substantially all of the potash must be in the above expressed size range for feed material. Since much of the triple superphosphate for commercial use is granulated to a particle size predominantly in the range of about —6 +35 mesh and the formulation may contain both regular and granular triple superphosphate, the 800 lbs. of specific size range material may be any desired combination of granular triple superphosphate and granular potash, the combination usually being dictated by economics.

Under special conditions of product specification, for example where the product size range is —6 +14, then a special sizing of product may be made to recover —14 +35 mesh size material in known quantity so as to reduce the quantities of more expensive granular products which must be incorporated in the mix for proper balance. Further where formulations incorporate fillers such as dolomite, the filler may be sized to provide a portion of the coring material of the desired particle size.

Ordinary superphosphate usually is removed from the storage pile, put through a clod-breaker, and comminuted. The particle size of superphosphate in the natural state is such that about 70% to 80% is less than 35 mesh particle size and less than about 10% is +14 mesh size. Triple superphosphate when comminuted gives material of particle size generally comparable to ordinary superphosphate. Granulated triple superphosphate on the other hand, usually has a particle size such that about 75% is +28 mesh size. This offers excellent material for balancing composition but the granulated triple superphosphate is generally held to the minimum because of its extra expense and because granulated feed materials ammoniate poorly.

Ammonia content of the mixed fertilizers generally is derived from gaseous ammonia, ammonium hydroxide solutions, ammonium nitrate-ammonia solutions, urea-ammonia solutions and the like. Since granular potash does not react with the ammonia directly but probably only by way of secondary base exchange reactions, and since the ammonia fixation reaction is generally with the superphosphates, balancing the formulation to use a minimum of granular superphosphates, which ammoniate poorly, is practiced unless the nitrogen grade is relatively low. In the instant process, the secondary reactions in the pile are minimized by coring with granular potash because less surface of potash is brought into direct contact with materials like ammonium nitrate than when the potash is all −28 mesh particle size.

While reference above has been made to 28 mesh size, it is not to be inferred that this is a critical upper limit of particle size except under those circumstances where the specified product size is −6 +20 mesh. If the product size is to be tailored to −6 +14 mesh, the lower limit on the particle size range of the feed ingredients is about 20 mesh. If the product size is to be −10 +28 mesh then the lower limit on the particle size range will be about 35 or 48 mesh. The upper limit on the size range of the product likewise is subject to variation depending upon the specified product size range. If the product size is to be tailored to −4 +20 mesh, the upper limit on the particle size range of the ingredients is about 6 to 8 mesh. If the product size is to be −14 +28 mesh, the upper limit of size range for the ingredients is about 16 to 20 mesh. Thus it will be seen that the upper limit on feed particle size should be equal to or preferably slightly less than the upper limit on the product.

The proportion of coring material to fines generally varies from about 40% to about 65% although with some special formulations such as 3-12-12, quantities slightly outside this range may be used.

In general, for mixed fertilizer compositions using the instant method and incorporating a minimum of water through addition of water substantially only as a component of the nitrogen solution, the reaction of nitrogen-bearing materials with phosphates in the low nitrogen mixes does not develop sufficient heat to raise the temperatures of the solids to between about 180° F. and about 220° F. The heat deficiency may be compensated for by one of two ways. Simultaneously with ammonia solution addition, sulfuric acid may be added. The reaction with sulfuric acid fixes part of the nitrogen as ammonium sulfate and the heat of reaction is sufficient in most instances to raise the temperature of the solids to the desired level. Another means of raising the temperature, when the solids are sufficiently high to condense only a small amount of vapors, is to pass steam usually at a temperature between about 215° F. and 350° F., through the tumbling solids in the wetting and preliminary conditioning zone.

In the low nitrogen grade fertilizers, if substantially all of bonding material is introduced as soluble nitrogen salts, it is often insufficient for formation of desirable pellets or granules. Under these circumstances, it is preferable that the added KCl have an appreciable quantity of fines which will be readily soluble in the liquid phase to provide additional soluble salts which upon drying of the mix will be available as bonding material. Granular superphosphate can be substituted for the potash to insure the proper balance between desired particle size fraction and fines.

When most of the desired particle size fraction material is supplied by granular potash or granular filler, the mixes show a markedly increased ability to ammoniate apparently due to reaction of thin layers of material being formed around the core with the free ammonia or ammonium reactants. Particularly the high ammoniation rate is apparent when introducing ammoniation compounds and finding no loss due to free ammonia in the ammoniation equipment exit gases or in gas from the dryer.

The processing steps for conversion of feed ingredients into granules or pellets comprises mixing fertilizer materials with strong agitation in a conditioner. During agitation a liquid nitrogenous component and sometimes simultaneously an acid is added. The moisture content of the mixing solids is maintained at a level such that the material discharged from the conditioner remains substantially as surface wetted particles interspersed with crumbly aggregates as distinct from nodules having a consistency of soft modeler's clays.

The wetted material is next dried while being tumbled to bond the drying material into multi-particle granules. Whether the rotary tumbler is a heated dryer or just a cooler depends upon the temperature of the wetted particles and their moisture content.

The solid ingredients are agitated in a conditioner which may be of the rotary drum type, pug mill type or equivalent apparatus. The solids and liquids are fed to this mixer-conditioner continuously and the rates of addition are such that holding time in the conditioner does not generally exceed 15 minutes. Holding time in the mixer is preferably limited to between about 5 and about 10 minutes.

From the mixer-conditioner, the crumbly mix goes to a rotary drier, generally of the lifter type, where water is removed. Solids may flow counter-current or concurrent to the flow of gases. The solids tumbled in the drying atmosphere agglomerate into hard pellets believed to be cemented together by crystallized materials such as ammonium nitrate, ammonia sulphate, urea, and potassium chloride, although this theory is expressed without any intention that the invention be bound to the theory. This theory of crystallization, however, is consistent with the end result of substantially no heat rise during storage and, therefore, substantially no chemical reaction taking place after the drying operation. Dry, warm pellets leave the drier at a temperature in the range between about 170° F. and about 250° F.

The hot pellets or, if the pre-conditioned material is of such a moisture content that the drier can be by-passed, the solids are cooled and solidified in a rotary or other suitable type cooler before being transferred to storage. In the cooler the pellets are lowered in temperature to between about 90° F. and about 150° F. In storage the particles at the interior of the storage pile may require several weeks to cool down to atmospheric temperature; but material prepared in accordance with applicants' invention shows little or no rise in temperature in the initial stages of storage, which rise would be an indication of continuing reaction. The invention will be further understood by reference to the following examples.

*Example I*

306 parts by weight of ordinary superphosphate containing approximately 20% $P_2O_5$ was introduced into a rotary drum conditioner of 6 foot diameter and 6 foot length. The drum rotated at approximately 6 r.p.m. To this tumbling superphosphate was added 763 parts by weight of triple superphosphate having a $P_2O_5$ content of approximately 45%. Next there was added to the tumbling mass 667 parts by weight of potassium chloride of approximately 60% $K_2O$. This material was tumbled under conditions such that the product issued from the drum at a rate of approximately 10 tons per hour, the above parts by weight being given to indicate the ratio of components. To the above weight of mixing solids was added 250 parts by weight of ammonium nitrate solution analyzing 40.6% nitrogen, 13.3% moisture, 65.0% as dissolved $NH_4NO_3$ and 21.7% as ammonia. Simultaneously with the addition of the nitrogen solution there was sprayed on the tumbling solids 140 parts by weight of 60° Bé. sulfuric acid.

The wetted solids were dried in a rotary kiln dryer having lifters to elevate the solids and drop them through the hot drying gases. Solids from the drum entered the dryer at a temperature of approximately 170° F., passed through the dryer in approximately 15 minutes, and issued therefrom at a temperature of approximately 190° F., approximately 140 lbs. of water having been removed in drying. The granules issuing from the dryer were cooled in a rotary kiln cooler to approximately 100° F. and delivered to storage.

Screen analysis of feed materials and products were as follows:

| Material | Mesh Size | | |
|---|---|---|---|
| | +10 | +20 | −35 |
| | Percent Cumulative | | |
| Superphosphate | 4.8 | 9.8 | 71.3 |
| Triple superphosphate | 24.9 | 42.9 | 31.3 |
| regular KCl | 4.0 | 8.1 | 42.1 |
| Product | 28.6 | 50.9 | 16.1 |

*Example II*

The feed ingredients and processing as described in Example I were followed except that instead of regular KCl, a granular KCl was substituted.

Screen analysis of the KCl and product were as follows:

| Material | Mesh Size | | |
|---|---|---|---|
| | +10 | +20 | −35 |
| | Percent Cumulative | | |
| Coarse KCl | 13.0 | 49.7 | 18 |
| Product | 78.4 | 95.8 | 1.4 |

Comparison of the products of Examples I and II shows that by increasing the content of −4 +10 mesh from approximately 3% to about 4.5% increased the −4 +10 of the product from 25.6% to approximately 55% and increasing the content of +20 mesh feed material from about 20% to about 35% increased the +20 mesh of the product from approximately 50.9% to approximately 95.8% making substantially all of the product in the desired size range and substantially eliminating fines.

*Example III*

The same 5-20-20 product was prepared as described in Example I with the exception that urea-ammonia solution analyzing 45.5% nitrogen, 17.6% moisture, 20.2% nitrogen as dissolved urea, 25.3% nitrogen as ammonia was substituted for ammonium nitrate ammonia solution, in one portion of the run, instead of regular triple superphosphate, granular triple superphosphate of a screen size −6 +20 mesh was used.

| Material | Mesh size Material, Percent −4 +20 | Percent of that mix, −4 +20 | Mesh size Product, Percent −4 +20 |
|---|---|---|---|
| regular triple super | 8.1 | 17.5 | 42 |
| granular triple super | 100 | 41.5 | 87 |

The above products differed also in their distribution of oversize and undersize, the product of regular triple showing 8% +4 mesh oversize and 26% −35 mesh fines whereas the product of granular triple super showed only 2% +4 mesh oversize and only 3% −35 mesh fines.

*Example IV*

A 10-10-10 product was made in the same manner as described in Example I using: 1000 parts by weight of regular superphosphate containing 20% $P_2O_5$; 555 parts of an ammoniating solution analyzing 41.0% nitrogen, 12.8% moisture, 65% ammonium nitrate and 22.2% as ammonia; 230 parts by weight of 60° Baumé sulfuric acid; 334 parts of regular potassium chloride of 60% $K_2O$ equivalent. The screen analysis of the regular potassium chloride used was:

Mesh size:              Percent cumulative on sieve
10 ———————————————————————— 0
14 ———————————————————————— 1.0
20 ———————————————————————— 4.5
28 ———————————————————————— 22.5
35 ———————————————————————— 42.0
48 ———————————————————————— 58.0
100 ——————————————————————— 83.5
200 ——————————————————————— 96.5
−200 —————————————— 3.5 passing through The product manufactured was of the following size analysis:

Mesh size:              Percent cumulative on sieve
4 ————————————————————————
6 ———————————————————————— 9.0
8 ———————————————————————— 28.5
10 ——————————————————————— 48.0
14 ——————————————————————— 64.5
20 ——————————————————————— 78.0

*Example V*

The feed materials and processing as described in Example IV were used, except that instead of regular KCl, a granular KCl was substituted. The granular KCl was of the following size analysis:

Mesh size:              Percent cumulative on sieve
6 ———————————————————————— 1.0
8 ———————————————————————— 6.5
10 ——————————————————————— 35.0
14 ——————————————————————— 66.5
20 ——————————————————————— 86.5
28 ——————————————————————— 88.5
35 ——————————————————————— 93.0
48 ——————————————————————— 96.0
100 —————————————————————— 98.0
200 —————————————————————— 99.0
−200 —————————————— 1.0 passing through The product obtained was of the following size analysis:

Mesh size:              Percent cumulative on sieve
4 ———————————————————————— 0.0
6 ———————————————————————— 3.0
8 ———————————————————————— 39.5
10 ——————————————————————— 86.0
14 ——————————————————————— 95.0
20 ——————————————————————— 99.5

Comparison of the products in Example IV and V shows that increasing the particle size of only one ingredient, the KCl, caused virtually all of the product to be made in the desired size range of −4 +20, and the product was much more uniform as 95% was in the −4 +14 mesh range.

Having thus described our invention what we claim is:
1. The process of producing a granular mixed fertilizer product of relatively uniform size wherein at least about 90% of the granules of the product are substantially dis- tributed throughout a size range which passes a predetermined maximum mesh size limit ($x$) within the range of about 4 to about 14 mesh and which are held by a predetermined minimum mesh size limit ($y$) within the range of about 14 to 35, said mesh range $-x + y$ embracing at least 8 mesh sizes which comprise admixing solid predominantly phosphate and potash fertilizer components to provide a mix having (a) larger size particles substantially distributed throughout a mesh size range which will pass about ($x+2$) mesh and be retained on about a ($y+7$) mesh; and
(b) fine size particles having a maximum size which will pass about a ($y+7$) mesh:

the larger size particles (a) constituting from about 40% to about 65% of the mixture (a)+(b); introducing into the mix an aqueous ammoniacal solution to produce a completed mixture having a temperature between about 180° F. and about 220° F. which, upon discharge from the mixing step, exits in the form of wetted particles and crumbly aggregates of particles, and removing water from the wetted material while tumbling to produce a granular product in which at least about 90 of the granules are in the desired range.

2. The process of claim 1 wherein the predetermined mesh range of the product is $-4 +20$.

3. The process of claim 2 wherein the predetermined mesh range of the product is $-6+20$.

4. The process of claim 1 wherein the feed materials are superphosphate, triple superphosphate and potash.

References Cited in the file of this patent

UNITED STATES PATENTS

| | | |
|---|---|---|
| 2,107,701 | Haase et al. | Feb. 8, 1938 |
| 2,136,793 | Gabeler et al. | Nov. 15, 1938 |
| 2,140,340 | Vogel | Dec. 13, 1938 |
| 2,287,759 | Hardesty et al. | June 23, 1942 |
| 2,680,680 | Coleman | June 8, 1954 |
| 2,710,795 | Douglas | June 14, 1955 |
| 2,739,886 | Facer | Mar. 27, 1956 |
| 2,798,801 | Kieffer et al. | July 9, 1957 |

UNITED STATES PATENT OFFICE
CERTIFICATION OF CORRECTION

Patent No. 2,971,832                 February 14, 1961

Thomas H. Stewart, Jr., et al.

It is hereby certified that error appears in the above numbered patent requiring correction and that the said Letters Patent should read as corrected below.

Column 8, line 3, for "90" read -- 90% --.

Signed and sealed this 5th day of September 1961.

(SEAL)
Attest:

ERNEST W. SWIDER
Attesting Officer

DAVID L. LADD
Commissioner of Patents